United States Patent [19]

Jacobs et al.

[11] Patent Number: 4,733,919
[45] Date of Patent: Mar. 29, 1988

[54] INTEGRATED PRESSURE EXHAUST VALVE AND FLUID COUPLING

[75] Inventors: John D. Jacobs, Brea; Karl Dabritz, Bellflower, both of Calif.

[73] Assignee: HWP Group, Inc., Montebello, Calif.

[21] Appl. No.: 24,339

[22] Filed: Mar. 10, 1987

[51] Int. Cl.⁴ .............................................. B60T 8/00
[52] U.S. Cl. ..................... 303/28; 137/102; 137/107; 280/421; 303/7; 303/35
[58] Field of Search .................. 303/7, 28, 24, 35, 36, 303/37, 38, 39; 137/102, 107; 280/421

[56] References Cited

U.S. PATENT DOCUMENTS

| | | | |
|---|---|---|---|
| 2,858,848 | 11/1958 | Wittren | 280/421 |
| 3,241,865 | 3/1966 | Pumphrey | 280/421 |
| 4,019,525 | 4/1977 | Horowitz | 137/107 |
| 4,204,555 | 5/1980 | Durling | 137/102 |
| 4,461,313 | 7/1984 | Beaumont | 137/102 |
| 4,475,575 | 10/1984 | Nishimura | 280/421 |
| 4,478,236 | 10/1984 | Neuzeret et al. | 137/107 |
| 4,596,265 | 6/1986 | Goodell | 137/102 |

FOREIGN PATENT DOCUMENTS 1147623 3/1985 U.S.S.R. .................... 303/7

OTHER PUBLICATIONS

SAE Standard J318 (SEP 80)–Air Brake Gladhand Service (Control) and Emergency (Supply) Line Couplers.
Phillips Manufacturing Company, Catalog & Service Guide, p. 21, 1983.
Sloan Valve Company, Catalog, cover and p. 7.
Midland Brake, Inc., Catalog L 20024, Extracts (cover and four pages).
Advertisement in "Heavy Duty Trucking", Oct., 1986, pp. 34-35, by Midland Brake, Inc.

Primary Examiner—Duane A. Reger
Assistant Examiner—Matthew C. Graham
Attorney, Agent, or Firm—Christie, Parker & Hale

[57] ABSTRACT

An integrated pressure exhaust valve and pneumatic coupling is used on a truck trailer for bringing air brake pressure from a tractor to the truck trailer. A gladhand coupling moiety is used for quick connection with an identical coupling moiety on the air pressure hose from the tractor. A check valve mechanism is incorporated in the body of the trailer coupling moiety for permitting air flow to the brakes when pressure from the tractor is greater than pressure in the trailer brake lines, and for permitting air flow from the brake lines to the atmosphere when pressure from the tractor is decreased. The integrated pressure exhaust valve and pneumatic coupling moiety can be mounted on the front of the trailer where it is found that pressure exhaust valve placement is most effective.

13 Claims, 5 Drawing Figures

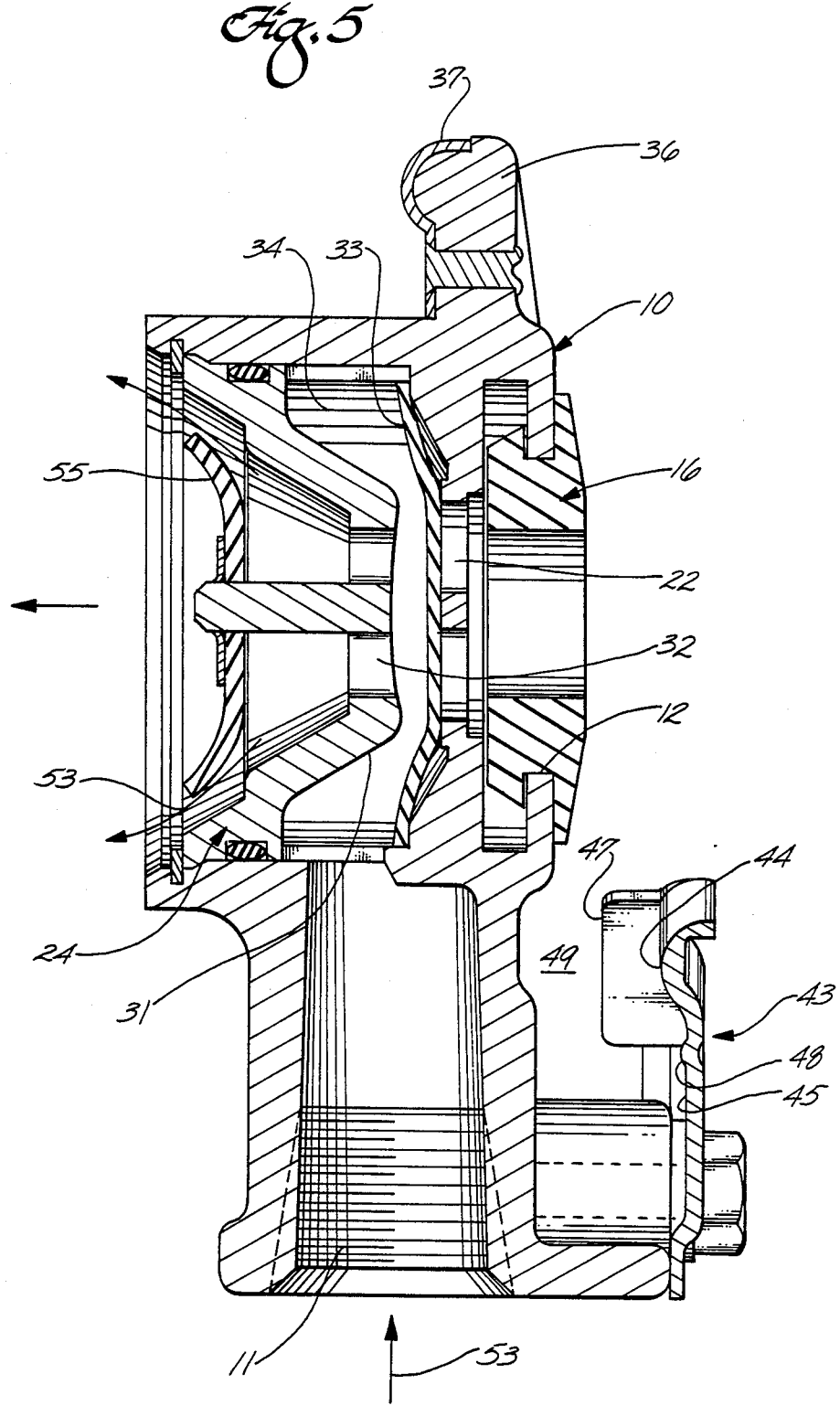

INTEGRATED PRESSURE EXHAUST VALVE AND FLUID COUPLING

BACKGROUND OF THE INVENTION

As will be apparent to even the most casual observer, the brakes on a large tractor-trailer rig are of critical importance. This invention relates to a component of the brake system for the trailer or van on a fifth wheel tractor-trailer rig. The invention may also be used for trailers hauled by a drawbar or other coupling.

In a tractor-trailer the trailer air brakes are connected to the source of air pressure in the tractor by flexible hoses. Such a hose typically has one end secured to the back of the tractor. The other end of the hose has one moiety of a quick disconnect coupling of the type known in the trade as a "gladhand".

A second moiety of a gladhand coupling is secured to the front face of the trailer to receive the coupling on the hose end. The coupling on the front of the trailer is in turn connected to the trailer brakes.

A gladhand is a standard, commercially available connector for tractor-trailer air brake lines. Its features are specified in Society of Automotive Engineers (SAE) Specification J318, which is hereby incorporated by reference. A gladhand consists of two functionally identical moieties with threaded connection to an air hose or pipe. Each half of the coupling has a pneumatic pressure "inlet" port in one face. The inlet port has an elastomeric seal having an approximately flat annular face around the inlet port. It will be recognized that referring to this pneumatic pressure port as an "inlet" port is simply a matter of convenience for description herein. When the coupling is connected, the two moieties have their respective inlet ports in direct communication, and one therefore serves as inlet while the other serves as an outlet. It will also be noted that in practice of the invention as described herein, the inlet pressure port does serve as an inlet. In other embodiments it may be an outlet. Also, as a matter of convenience in this description, the face of the coupling having the seal is referred to as the "front" and the opposite face is referred to as the "back".

Each moiety of the gladhand has a wing at one end with an arcuate locking surface concentric with the inlet port. At the other end of the gladhand there is a pocket open at one end and having an arcuate locking surface concentric with the inlet port. To assemble the gladhand the rubber seals are placed in face to face engagement. One half of the coupling is then twisted relative to the other around the axis of the inlet port so that the wing on each half enters the open end of the pocket on the other half. The locking surfaces engage each other to hold the coupling in tight engagement. A short twist in the opposite direction disconnects the coupling.

When the brake pedal is depressed, air pressure in the brake lines builds up rapidly to apply the brakes. When the brake pedal is released, air pressure in the lines decreases and the brakes are released. Air pressure can be applied quickly since the tractor air pressure is typically about 95 psi (6.68 kg/cm$_2$). The ON signal to apply the brakes travels quickly through the pneumatic tubing to the brake actuator. However, the response time is considerably longer for an OFF signal to release the brakes, since the entire service line must vent to about 5 psi (0.35 kg/cm$_2$) before brake release will occur. For long rigs the release time may be from one to one and a half seconds.

There are several reasons why faster response to an OFF signal in truck air brakes is desired. Inexperienced or careless drivers may accelerate before the brakes fully release. In many situations a truck may continue to roll under its own momentum after the driver releases the brake pedal. In either event the trailer is dragged against some braking action that causes unnecessary wear on brake drums and shoes, and on tires. Further, slow release of the brakes can cause accidents, for example, in a situation where the road surface is slick, and skidding or sliding is a hazard.

It has been found that pressure exhaust or "dump" valves in truck air brake lines can reduce the trailer brake release time to about a half second. Pressure exhaust valves have been designed to promptly exhaust pressure from the air brake system when the air pressure commences decreasing and before the brakes release. These pressure exhaust valves have been placed in close proximity to the air brake actuators and reservoirs at the brake axles. In this location they may be 50 to 60 feet downstream from the tractor, and time is required for a brake release signal to reach and actuate such valves. It has now been found that optimum results are obtained when such a pressure exhaust valve is at the forward end of the trailer, preferably within 1.5 meters of the gladhand connecting the tractor air line to the trailer air line.

It is therefore desirable to provide a pressure exhaust valve at the forward end of a trailer for optimum brake operation. The location should be safe and readily accessible for maintenance.

SUMMARY OF THE INVENTION

There is therefore provided in practice of this invention, according to a presently preferred embodiment, an integrated pressure exhaust valve and pneumatic coupling for connecting an air brake line of a tractor-trailer combination. The integrated structure has a hollow body with a pneumatic pressure inlet port on one face and an exhaust opening on the opposite face. An elastomeric seal is provided around the inlet port. A pneumatic pressure outlet is provided at an end of the body. A wing on one end of the body has an arcuate locking surface substantially concentric with the inlet port. A pocket at the opposite end of the body has an arcuate locking surface substantially concentric with the inlet port and complementary with the locking surface on the wing so that a second coupling half having an identical seal, wing and pocket can be assembled in locking and sealing engagement with the integrated valve and coupling provided in practice of this invention.

The interior of the body is divided by a membrane having a plurality of apertures for air flow between the inlet and outlet ports. A generally circular plug is sealed in the exhaust opening. The plug has an inwardly directed, generally frustoconical extension with a plurality of apertures at its end for exhausting air from within the body through the plug. The end of the extension is spaced away from the membrane in the coupling body. A circular elastomeric diaphragm is disposed in the body between the exhaust plug extension and the membrane. The membrane has sufficient diameter that it can alternatively block the apertures through the plug extension or the apertures through the membrane, depending on the direction of application of pressure to the diaphragm.

Summarized in another way, this invention provides an integrated fluid coupling moiety and pressure exhaust valve which includes a hollow body having a valve chamber therein. A fluid inlet port communicates to one side of the chamber from a face of the body. A fluid exhaust port communicates from an opposite side of the chamber to the exterior of the body, and a fluid outlet port communicates from an end of the chamber to the exterior of the body. Resilient seal means are carried by the body about the inlet port. Separate complementary male and female coupling configurations are carried on the body at spaced locations about the inlet port adapting the body for fluid-sealing and locking engagement with a second coupling moiety having corresponding configurations by placing the moieties in face-to-face engagement and twisting one relative to the other. Check valve means are movable in the chamber in response to pressure differentials for closing the exhaust port from the chamber and for affording fluid flow from the inlet port to the outlet port when fluid pressure at the inlet port is greater than that at the outlet port, and for closing the inlet port from the chamber and for affording fluid flow from the outlet port through the exhaust port when fluid pressure at the outlet port is greater than that at the inlet port.

BRIEF DESCRIPTION OF THE DRAWINGS

These and other features and advantages of this invention will be appreciated as the same becomes better understood by reference to the following detailed description when considered in conjunction with the accompanying drawings wherein:

FIG. 5 is the same cross section as FIG. 3 when the air brakes are being released.

DETAILED DESCRIPTION

Figure 1:
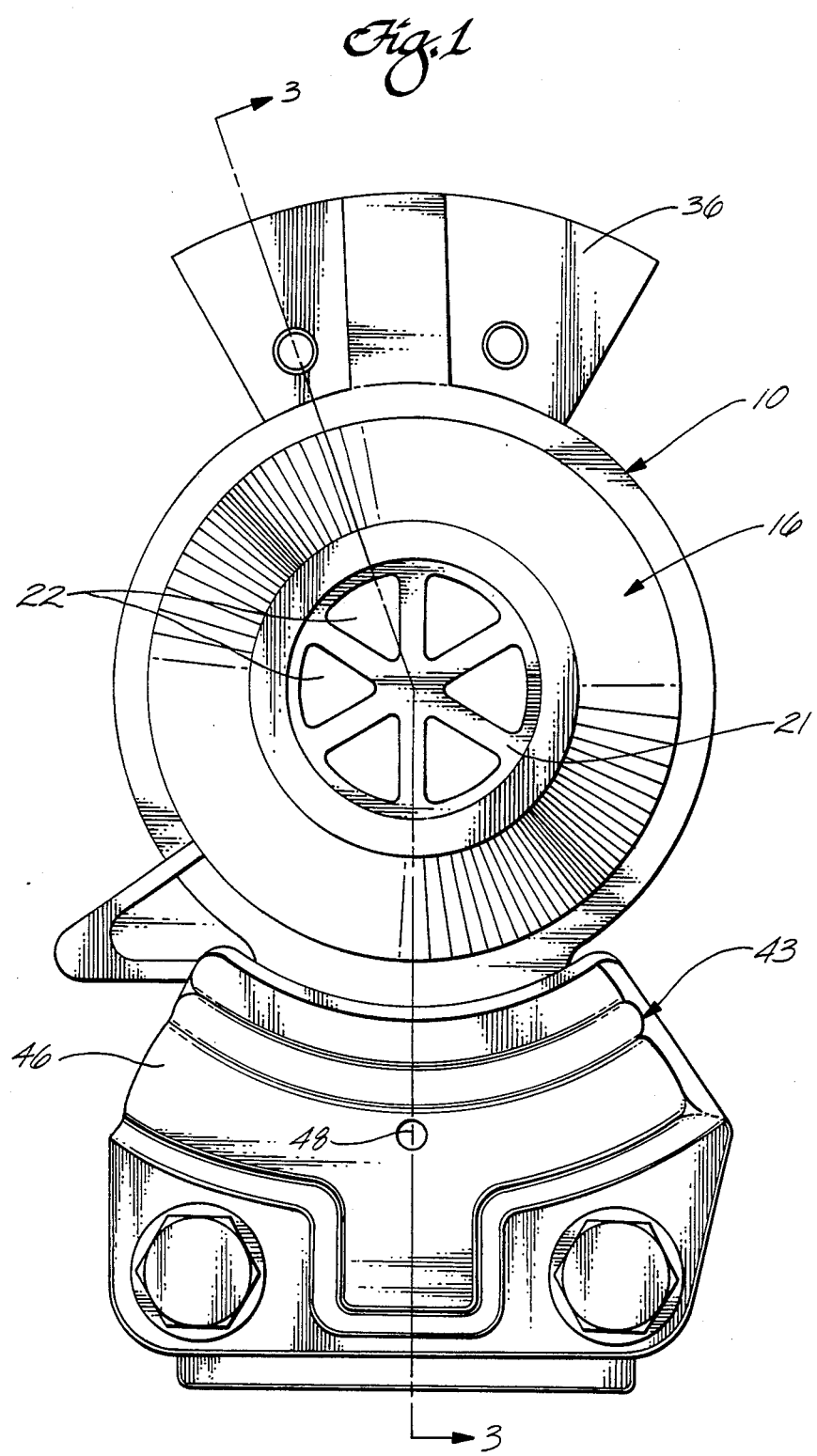
FIG. 1 is an elevation of a "front" face of an integrated pressure exhaust valve and pneumatic coupling moiety designed and constructed according to principles of this invention.
Figure 2:
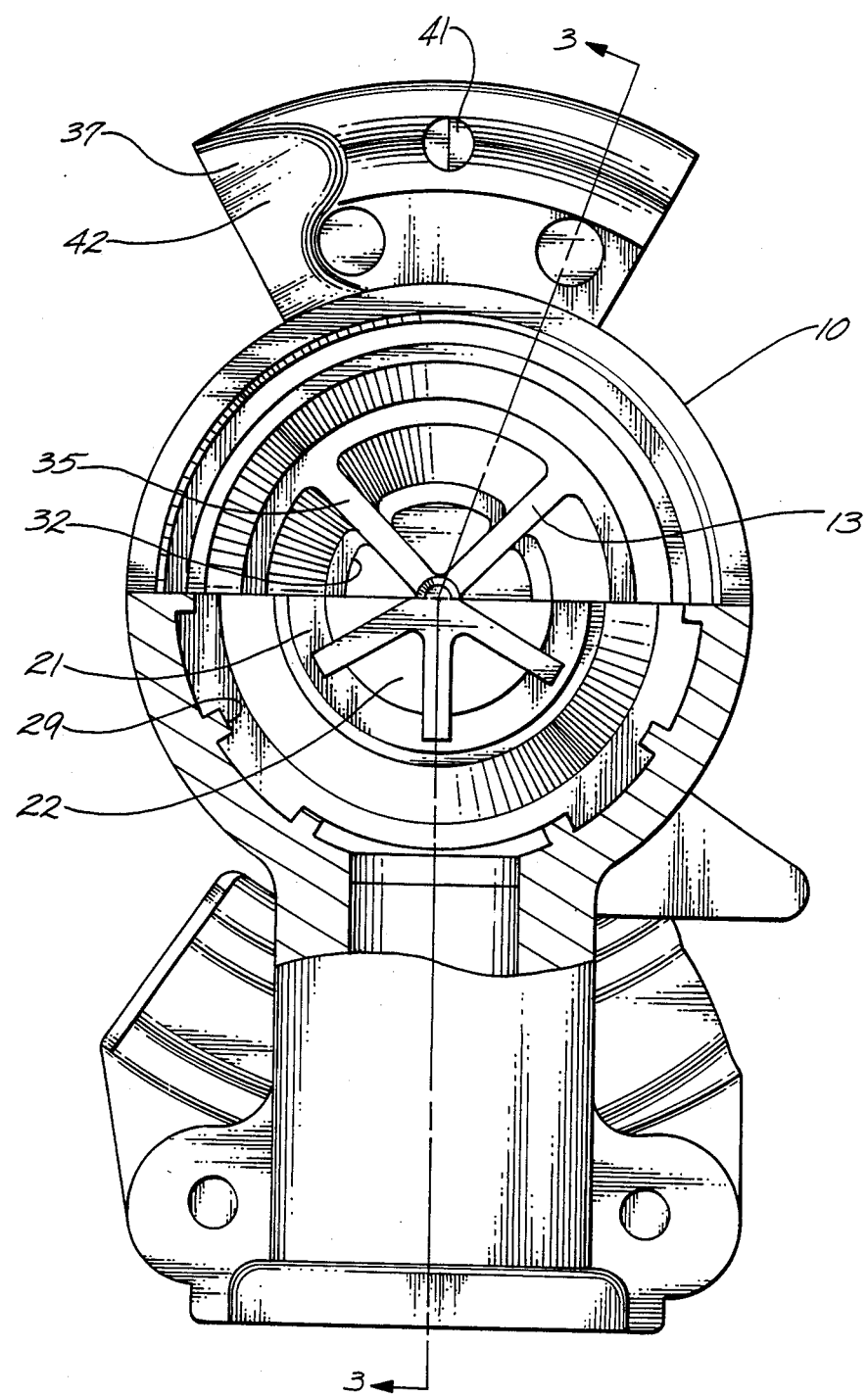
FIG. 2 is an elevation of the "back" of the valve and coupling as taken along line 2—2 in FIG. 3.

The integrated pneumatic pressure exhaust valve and coupling provided in practice of this invention comprises a hollow body 10 of die cast aluminum or cast steel. At one end of the body there is an outlet port 11 having a female pipe thread. The outlet port of the valve and coupling can be assembled on the air brake pipe on the front of a trailer.

A circular inlet port 12 is provided on one face of the valve and coupling body. There is an annular undercut region 13 around the inlet port to define an inwardly directed flange 14. An elastomeric seal 16 has an annular flange 17 that fits into the undercut region 13 to hold the elastomeric seal onto the body. The central exposed face 18 of the seal is approximately flat and is surrounded by a slightly tapered conical margin 19. A flat face on the seal mates to the flat face of a like seal on another coupling moiety to provide a pneumatic seal.

Inwardly from the inlet port, an integral membrane 21 divides the interior of the body between the inlet and outlet ports. Multiple apertures 22 in a circle extend through the membrane to permit air flow between the inlet and outlet ports.

On the opposite side of the membrane from the inlet port there is a large diameter exhaust opening 23. The exhaust opening preferably is located coaxially of the center of inlet port 12. A plug 24 is secured in the exhaust opening by a snap ring 26. The plug has a peripheral flange 27 that seats on a shoulder 28 within the hollow body; the shoulder is defined by the rear ends of a series of ribs 30 which are raised from the walls of opening 23 intermediate membranes 21 and the rear end of the opening. The perimeter of the plug flange is sealed to the body by an O-ring 29. The plug is substantially hollow and has a frustoconical extension 31 extending toward the membrane. The slightly concave end of the frustoconical extension has multiple apertures 32 in a circle about the same size as the circle of holes through the membrane. The membrane and the plug are located on opposite sides of a valve chamber 34 in the body end to which the outlet port communicates.

The apertures in the membrane preferably are wedge-shaped, i.e., resemble circular segments, to provide the inlet port with as large a flow area as possible. Similarly, the apertures in plug extension 31 also are wedge-shaped to define a large flow area through the plug. Plug apertures 32 are separated by radial webs 35 which extend in the plug from the front of the extension toward the rear face of the plug where the webs terminate in a common plane normal to the plug axis.

A circular elastomeric diaphragm 33 fits between the extension on the plug and the membrane substantially normal to the axis of the inlet port. The diaphragm is centered by ribs 29 so that it overlies both the apertures 22 in membrane 21 and the openings 32 in plug extension 31. The distance between the opposing faces of membrane 21 and plug extension 31 is slightly less than the thickness of diaphragm 33 so that the edges of the diaphragm are located slightly rearwardly of the center of the diaphragm at the plug extension and the diaphragm normally is loaded against the plug extension.

Figure 3:
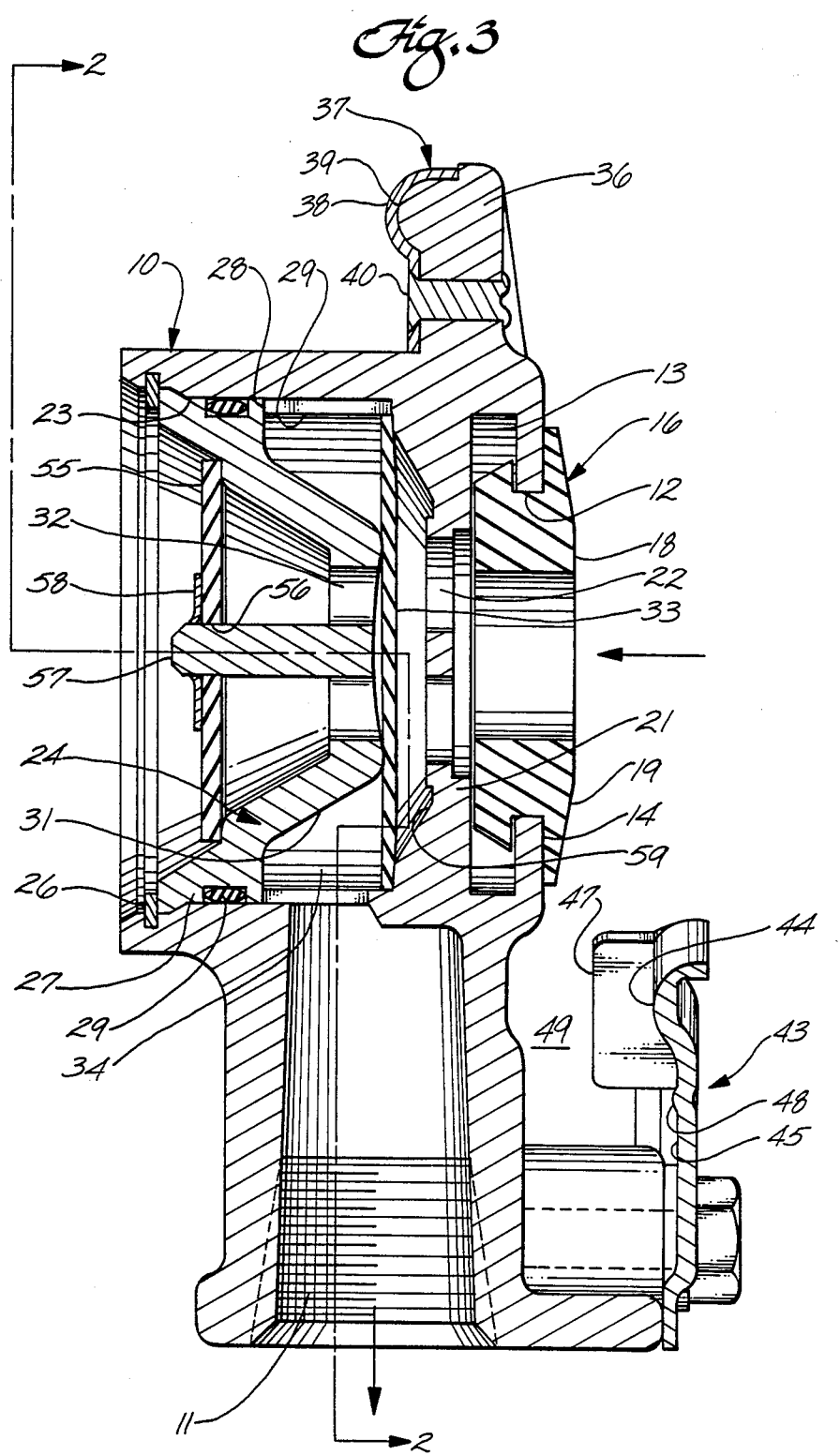
FIG. 3 is an longitudinal cross section of the integrated pressure exhaust valve and pneumatic coupling taken along lines 3—3 in FIGS. 1 and 2, showing the valve and coupling in a neutral state.
Figure 4:
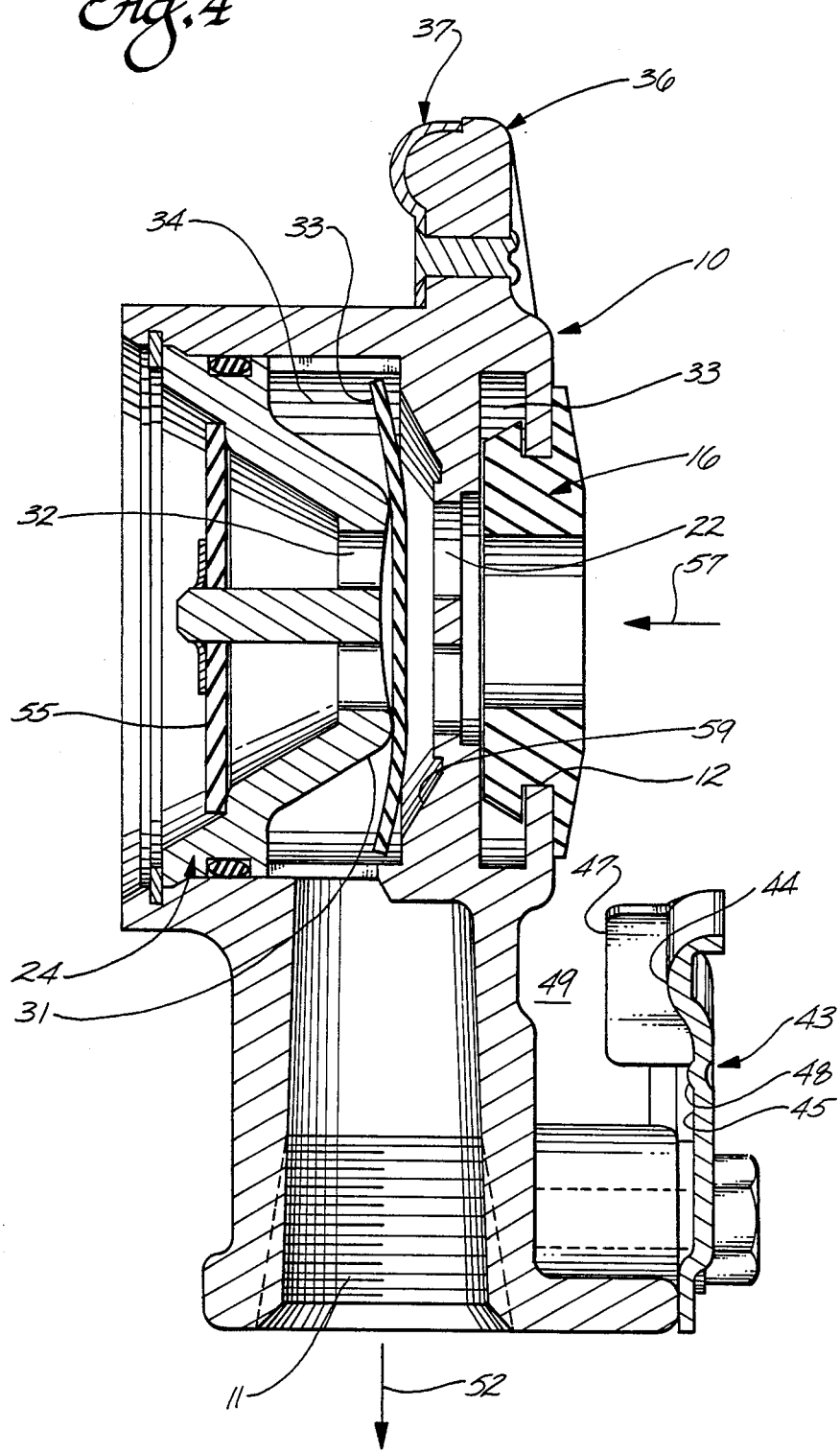
FIG. 4 is the same cross section as FIG. 3 when the air brakes are being applied.

The flat diaphragm 33 has a sufficient thickness that one face engages the annular surface 30 around the membrane and the other face engages the end of the frustoconical extension on the plug when no air pressure differential exists in the valve; see FIG. 3. When the truck air brakes are applied, the air pressure forces the diaphragm 33 tightly against the end of the frustoconical extension 31 of the plug in the exhaust opening to seal the apertures 32 through the plug. The differential pressure also deflects the edges of the diaphragm as illustrated in FIG. 4 and permits air flow to valve chamber 34 and then to the outlet port 11 to the air brakes as illustrated by the arrow 52 in FIG. 4. The diameters and cone angles of the end of the extension on the plug and the conical step 59 around the membrane are selected so that the diaphragm has ample space to deflect as illustrated, and impose negligible hindrance to air flow when the brakes are applied.

When air pressure is released from the tractor, pressure at the outlet port becomes greater than pressure at the inlet port. This quickly deflects the center of the diaphragm away from the extension on the plug and against the membrane 21 as illustrated in FIG. 5. Air then flows from the outlet port and brakes, through the apertures in the plug to be exhausted to the atmosphere.

The coupling is constructed to mate with a conventional gladhand conforming to SAE Standard J318. At the end of the body opposite the outlet port 11 there is a longitudinally extending wing 36. A steel shoe 37 substantially conforming to the surface of the wing is riveted on the back face of the wing. The shoe includes an arcuate hump 38 overlying a similar arcuate hump 39 on the back face of the wing. The hump 38 on the shoe forms a locking surface concentric with the inlet port 12. A detent dimple 41 is provided in the locking surface for inhibiting disconnecting of the coupling. A channel 40 is defined by shoe 37 concentric to the arcuate extent of hump 38, and radially inwardly of the hump just adjacent the hump; the channel has a substantially flat bottom which lies forwardly of the rearmost extent of the hump in a plane perpendicular to the axis of inlet port 12. A tapered ramp 42 at one of the wing aids in making the connection when the coupling moiety is assembled with a like moiety.

A steel plate 43 is secured to the front of the body at the opposite end of body 10 from the wing 36 to be disposed substantially perpendicular to the axis of inlet port 12 and forwardly of the front face of body 10. The back surface of plate 43, at the end of the plate adjacent the inlet port axis, is contoured essentially reversely identically to the contour of the back face of shoe 37 carried by wing 36. Thus, the plate back surface defines a hump 44 and a channel 45, and a ramp 46 (see FIG. 1) into the channel. The plate has a rearwardly extending tab 47 across the end of the channel opposite from ramp 46. However, the features defined by the back face of plate 43 are reversed in location relative to the inlet port axis from the location of the corresponding features defined by the back surface of shoe 37. A dimple 48 extends slightly rearwardly from the center of channel 45 at its arcuate midlength; the dimple is the reverse of dimple 41 in shoe 37. The spacing of plate 43 from the front face of body 10 forms a pocket 49 for receipt of the wing and shoe elements of the other coupling moiety upon interengagement of the two moieties.

When the valve and coupling is assembled with a similar coupling, the wing of each coupling moiety fits into the pocket of the other coupling moiety. As so interfitted, shoe hump 38 cooperates in plate channel 45, and plate hump 44 cooperates in shoe channel 40, with dimples 41 and 48 cooperating with each other as a detent. The two moieties are assembled by placing the faces of the two seals together and twisting the wing of each moiety counterclockwise into the pocket of the other moiety. A clockwise twist can be used to disconnect the coupling.

In the gladhand coupling moiety which cooperates with body 12, there is no exhaust opening 23 or associated structure. There is, instead, a solid wall. Thus, in the other coupling moiety (not shown), there is a passage from opening 12 to opening 11.

When the integrated exhaust valve and coupling moiety mounted on the front of a trailer is connected to a coupling moiety on an air hose from the tractor cab and the air brakes are applied, pneumatic pressure is applied at the trailer moiety inlet port as indicated by the arrow 51. The air pressure forces the diaphragm 33 against the end of the frustoconical extension 31 of the plug in the exhaust opening and deflects the diaphragm at its margin. This seals the apertures 32 through the plug. Air pressure is therefore applied through the outlet port 11 to the air brakes as illustrated by the arrow 52 in FIG. 4. The taper of the conical aspect of extension 31 is sufficiently great that high pressure air cannot deflect the diaphragm to conform to the plug contour at the margins of the diaphragm.

When air pressure is released from the tractor, pressure at the outlet port becomes greater than pressure at the inlet port and air reverses flow through the valve, as shown by arrow 53 in FIG. 5. This reversal of pressure quickly displaces the diaphragm away from the extension on the plug and against the membrane 21 as illustrated in FIG. 5. The reversed pressure effect acts on the margins of the diaphragm to cause the diaphragm to move away from the exhaust port into closure relation to the inlet port. Air then flows from the outlet port and the brakes, through the apertures in the plug to be exhausted to the atmosphere. During venting of air through the plug, the diaphragm 33 seats against an annular conical step 59 around the membrane. This prevents the diaphragm from seating tightly against the membrane and assures virtually instantaneous opening of the valve if the diaphragm should happen to be pressed against the membrane when the brakes are applied.

As shown in FIGS. 3-5, a protective resilient elastomeric disc is disposed across the rear ends of plug openings 32. The disc has a diameter sufficient to extend radially outwardly beyond the rear ends of openings 32, thus to close the openings in the normal undeflected state of the disc. The disc has a central opening 56 by which the disc is positioned on a post 57 which is, in effect, a continuation of the junction of webs 35 rearwardly beyond the common plane of the rear edges of the webs separating openings 32. The disc normally lies against the rear edges of webs 35 and in a seat 60 which is defined in the plug circumferentially of the group of openings 32. The disc is held on post 57 and against the web edges by a snap ring 58 or other mounting device.

FIG. 5 shows that when valve diaphragm 33 operates in its exhaust mode to open exhaust opening 23 via apertures 32, the air pressure applied to the forward face of disc 55 causes it to deflect readily rearwardly around its outer margin. In this way air in the trailer brake lines is exhausted to atmosphere. The presence of the disc causes the exhaust air to emerge from the exhaust opening as a generally conically flaring air stream rather than as concentrated jet of air. The conically flaring exhaust stream is relatively diffused, thereby protecting any person nearby from a concentrated stream of air and any particles or water drops which may be carried by the exhaust air. In its normal undeflected state, disc 55 closes the exhaust opening so that rain water, dust particles, and the like cannot enter into apertures 32 or valve chamber 34.

Also, as is shown in FIG. 3, the flow area of plug apertures 32 increases from the ends of the apertures to valve chamber 34 to the rear of the plug. The apertures thus act like diffusing nozzles for exhaust air admitted to them.

Disc 55 is readily replaceable, if needed, on post 57. Valve diaphragm 33 is replaceable by removal of plug 24 from exhaust opening 23. Periodic replacement of disc 55 and diaphragm 33 is desirable to assure reliable and trouble-free operation of the valve mechanism.

It will be apparent that the pneumatic pressure exhaust valve operates as a three port, double acting check valve in the brake line. When brake air pressure is applied it prevents air flow through the apertures in the exhaust port plug, and when brake pressure is released, it prevents air flow toward the tractor, but instead diverts it to vent to atmosphere through the plug in the exhaust opening.

The inlet port is concentric with the locking surfaces to make the coupling operate properly. The exterior geometry of body 10 at and in the vicinity of wing 36 is determined in major part by the provisions of SAE Standard J318. A significant aspect of the invention is the provision of exhaust valve functions in the coupling within the footprint of the area of the coupling affected by SAE Standard J318 without adverse impact upon the geometry of the coupling as required by that SAE Standard.

By integrating the brake pressure exhaust valve with the gladhand coupling, the unit can be easily added to existing tractor-trailer rigs. The gladhand that is presently employed on the front of the trailer is simply removed and the integrated valve and coupling described herein is mounted in its place. This not only adds a pressure exhaust valve to the brake system, but places the valve in the location where it has been found to be most effective. With well over a million tractor-trailer rigs on the roads of the United States alone, integration for retrofitting existing vehicles is of considerable importance. The integrated structure is also economical for incorporation in the quarter million new trailers purchased each year. A given trailer, over its useful life, likely will be coupled to many different tractors. It is very important that the interfaces between all trailers and all tractors in a given geographical area, which can be international in scope, be identical so that any tractor can be coupled to any trailer. The integrated pressure exhaust valves and gladhand coupling moiety as a coupling moiety, is the same as the numerous moieties which now exist, and so can effectively be mounted on existing trailers and upon trailers of new construction with complete compatibility with existing tractors.

Although only one embodiment of integrated pneumatic pressure exhaust valve and pneumatic coupling has been described and illustrated herein, it will be apparent that many modifications and variations may be made by one skilled in the art. Variations may be made, for example, in the specific details of the apertures through the membrane and plug to change area and cooperation with the diaphragm. A screen may be provided between the snap ring and plug to keep dirt out of the brake system. If desired, attachment pads or the like may be molded on the side of the die cast body for mounting the valve and coupling to a trailer body or the like. Other types of three port, double acting check valves suitable for deflecting air flow as described may be integrated with a gladhand coupling. Many other modifications and variations will be apparent to one skilled in the art and it is therefore to be understood that, within the scope of the appended claims, the invention may be practiced otherwise than as specifically described.

What is claimed is:

1. An integrated pressure exhaust valve and pneumatic coupling moiety comprising:
   a hollow body having a pneumatic pressure inlet port on one face of the body, an exhaust opening on the opposite face of the body, and a pneumatic pressure outlet port at an end of the body;
   an elastomeric seal having an approximately flat annular face around the inlet port;
   a wing at one end of the body having an arcuate locking surface substantially concentric with the inlet port;
   a pocket at the opposite end of the body from the wing, having an arcuate locking surface substantially concentric with the inlet port and complementary with the locking surface on the wing so that a second coupling moiety having an identical seal, wing and pocket can be assembled in locking and sealing engagement with the integrated valve and coupling moiety by placing the seals in face to face engagement and twisting one moiety relative to the other moiety for engaging the respective wings and pockets;
   a membrane dividing the interior of the body between the inlet port and the outlet port, and including a plurality of apertures through the membrane for permitting air flow therethrough;
   a generally circular plug sealed in the exhaust opening and having a plurality of apertures between the interior and exterior of the plug for exhausting pneumatic pressure from within the body, a face of the plug being spaced apart from the membrane; and
   a circular, elastomeric, diaphragm in the body between the membrane and plug, the diaphragm having a sufficiently large diameter for alternatively blocking the apertures through the plug or the apertures through the membrane.

2. An integrated valve and coupling moiety as recited in claim 1 wherein the plug comprises a frustoconical extension extending toward the membrane and the apertures are in the end of the extension.

3. An integrated valve and coupling moiety as recited in claim 2 comprising an O-ring seal between the perimeter of the plug and the body and a snap ring engaging the body for retaining the plug.

4. Apparatus according to claim 1 including means for diffusing air flowing from within the body through the exhaust opening.

5. Apparatus according to claim 4 wherein the means for diffusing air includes means for closing the exhaust opening from entry of water and the like into the body through the exhaust opening.

6. An integrated pneumatic coupling moiety and pressure exhaust valve comprising:
   a hollow body having a pneumatic pressure inlet port on one face of the body, an exhaust opening on the opposite face of the body, and a pneumatic pressure outlet port at an end of the body;
   a seal on the inlet port, a wing on the body, and a pocket complementary to the wing, the seal, wing and pocket conforming to SAE J318; and
   a check valve means in the body for
   (a) permitting air flow from the inlet port to the outlet port and preventing air flow from the exhaust opening when air pressure at the inlet port is greater than air pressure at the outlet port, and
   (b) permitting air flow from the outlet port to the exhaust opening and preventing air flow to the inlet port when air pressure is greater at the outlet port than at the inlet port.

7. An integrated valve and coupling moiety as recited in claim 6 wherein the check valve means comprises a membrane in the coupling body having a least one aperture therethrough for air flow between the inlet port and outlet port, a plug in the exhaust opening having at least one aperture for air flow from within the body to the exterior of the body and a flexible diaphragm between the plug and membrane, the thickness of the diaphragm being less the distance between the plug and membrane.

8. An integrated valve and coupling moiety as recited in claim 7 wherein the membrane is normal to the axis of the inlet port and concentric therewith.

9. An integrated valve and coupling moiety as recited in claim 7, wherein the plug comprises a frustoconical extension extending toward the membrane and the apertures are in the end of the extension.

10. An integrated valve and coupling moiety as recited in claim 9 comprising an O-ring seal between the perimeter of the plug and the body and a snap ring engaging the body for retaining the plug.

11. An integrated valve and coupling moiety according to claim 6 including means associated with the exhaust opening for preventing the entry of foreign matter into the body through the exhaust opening.

12. An integrated fluid coupling moiety and pressure exhaust valve comprising:
   a hollow body having a valve chamber therein;
   a fluid inlet port to one side of the chamber from one face of the body;
   a fluid exhaust port from an opposite side of the chamber to the exterior of the body;
   a fluid outlet port from an end of the chamber to the exterior of the body;
   resilient seal means carried by the body about the inlet port;
   separate complementary male and female coupling configurations carried on the body at spaced locations about the inlet port adapting the body for fluid-sealing and locking engagement with a second coupling moiety having corresponding coupling configurations by placing the moieties in face-to-face engagement and twisting one relative to the other;
   and check valve means movable in the chamber in response to pressure differentials for closing the exhaust port from the chamber and for affording fluid flow from the inlet port to the outlet port when fluid pressure at the inlet port is greater than that at the outlet port, and for closing the inlet port from the chamber and for affording fluid flow from the outlet port through the exhaust port when fluid pressure at the outlet port is greater than that at the inlet port.

13. Apparatus according to claim 12 wherein the valve means comprises a relatively thin flexible disc of sufficient diameter to separately close either the inlet port or the exhaust port and movable in the chamber between said ports.

* * * * *

REEXAMINATION CERTIFICATE (1087th)
United States Patent [19]
Jacobs et al.

[11] B1 4,733,919
[45] Certificate Issued Jun. 27, 1989

[54] INTEGRATED PRESSURE EXHAUST VALVE AND FLUID COUPLING

[75] Inventors: John D. Jacobs, Brea; Karl Dabritz, Bellflower, both of Calif.

[73] Assignee: HWP Group, Inc., Montebello, Calif.

Reexamination Request:
No. 90/001,620, Oct. 14, 1988

Reexamination Certificate for:
Patent No.: 4,733,919
Issued: Mar. 29, 1988
Appl. No.: 24,339
Filed: Mar. 10, 1987

[51] Int. Cl.⁴ .......................... B60T 8/00; F16K 1/00
[52] U.S. Cl. .................................. 303/28; 137/102; 137/107; 280/421; 303/7; 303/35; 303/69
[58] Field of Search .................. 303/7, 28, 29, 35, 36, 303/38, 39, 68, 69, 40; 251/288; 137/102; 280/421

[56] References Cited

U.S. PATENT DOCUMENTS

| | | | |
|---|---|---|---|
| 2,858,848 | 11/1958 | Wittren | 280/421 |
| 3,150,899 | 9/1964 | Berg et al. | 303/22.1 |
| 3,156,330 | 11/1964 | Berg | 403/260 |
| 3,182,566 | 5/1965 | Berg et al. | 92/24 |
| 3,191,620 | 6/1965 | Berg | 137/551 |
| 3,241,865 | 3/1966 | Pumphrey | 280/421 |
| 3,249,123 | 5/1966 | Berg | 137/625.26 |
| 3,255,676 | 6/1966 | Berg et al. | 92/29 |
| 3,256,047 | 6/1966 | Berg et al. | 303/22.7 |
| 3,302,682 | 2/1967 | Berg | 152/415 |
| 3,476,019 | 11/1969 | Berg et al. | 91/420 |
| 3,533,433 | 10/1970 | Berg | 137/204 |
| 3,545,815 | 12/1970 | Berg | 303/7 |
| 3,554,230 | 1/1971 | Berg et al. | 137/614.04 |
| 3,582,149 | 6/1971 | Berg | 303/7 |
| 3,696,711 | 10/1972 | Berg et al. | 92/48 |
| 3,960,365 | 6/1976 | Horowitz | 251/286 |
| 4,019,525 | 4/1977 | Horowitz | 137/107 |
| 4,091,837 | 5/1978 | Edmonds et al. | 137/341 |
| 4,204,555 | 5/1980 | Durling | 137/102 |
| 4,461,313 | 7/1984 | Beaumont | 137/102 |
| 4,475,575 | 10/1984 | Nishimura | 280/421 |
| 4,478,236 | 10/1984 | Neuzeret et al. | 137/107 |
| 4,544,132 | 10/1985 | Allen et al. | 251/318 |
| 4,550,928 | 11/1985 | Berg | 280/421 |
| 4,596,265 | 6/1986 | Goodell | 137/102 |
| 4,621,714 | 11/1986 | Skurka | 188/196 BA |
| 4,624,345 | 11/1986 | Berg et al. | 188/196 M |
| 4,643,279 | 2/1987 | Skurka | 188/79.55 |

FOREIGN PATENT DOCUMENTS 1172972 6/1964 Fed. Rep. of Germany.
1938206 2/1971 Fed. Rep. of Germany.
3413682 1/1985 Fed. Rep. of Germany.

OTHER PUBLICATIONS

SAE Standard J318 (Sep. 80)–Air Brake Gladhand Service (Control) and Emergency (Supply) Line Couplers.
Phillips Manufacturing Company, catalog & Service Guide, p. 21, 1983.
Sloan Valve Company, catalog, cover and p. 7.
Midland Brake, Inc., catalog L20024, Extracts (cover and four pages).
Advertisement in "Heavy Duty Trucking", Oct., 1986, pp. 34–35, by Midland Brake, Inc.

Primary Examiner—Andres Kashnikow
Assistant Examiner—Matthew C. Graham

[57] ABSTRACT

An integrated pressure exhaust valve and pneumatic coupling is used on a truck trailer for bringing air brake pressure from a tractor to the truck trailer. A gladhand coupling moiety is used for quick connection with an identical coupling moiety on the air pressure hose from the tractor. A check valve mechanism is incorporated in the body of the trailer coupling moiety for permitting air flow to the brakes when pressure from the tractor is greater than pressure in the trailer brake lines, and for permitting air flow from the brake lines to the atmosphere when pressure from the tractor is decreased. The integrated pressure exhaust valve and pneumatic coupling moiety can be mounted on the front of the trailer where it is found that pressure exhaust valve placement is most effective.

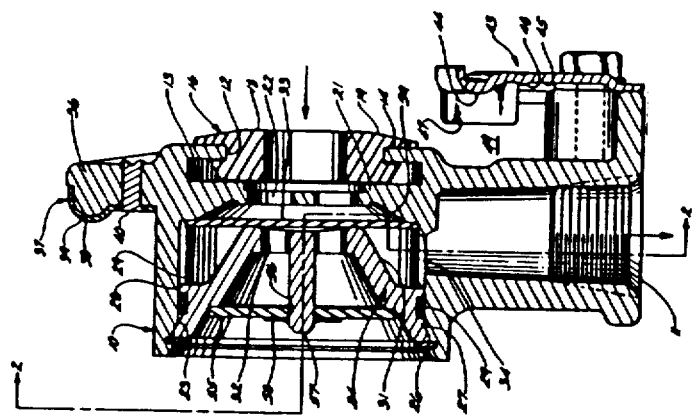

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 is confirmed.

* * * * *